United States Patent [19]

Hasegawa et al.

[11] Patent Number: 5,290,546
[45] Date of Patent: * Mar. 1, 1994

[54] METHOD FOR THERMAL VAPORIZATION OF CHEMICAL

[75] Inventors: Takahiro Hasegawa; Takanobu Kashihara; Junichiro Mesaki; Akira Nishimura, all of Ako, Japan

[73] Assignee: Earth Chemical Co., Ltd., Ako, Japan

[*] Notice: The portion of the term of this patent subsequent to Aug. 6, 2008 has been disclaimed.

[21] Appl. No.: 942,360

[22] Filed: Sep. 9, 1992

Related U.S. Application Data

[60] Division of Ser. No. 710,482, Jun. 5, 1991, abandoned, which is a division of Ser. No. 425,211, Oct 6, 1989, Pat. No. 5,038,394.

[30] Foreign Application Priority Data

| Feb. 10, 1988 [JP] | Japan | 63-16533 |
| Jun. 1, 1988 [JP] | Japan | 63-72878 |
| Aug. 23, 1988 [JP] | Japan | 63-110371 |
| Nov. 17, 1988 [JP] | Japan | 63-150437 |

[51] Int. Cl.$^5$ .......................... A61L 9/01; A61L 9/02; A61L 9/03; A01N 57/00
[52] U.S. Cl. .................................. 424/76.2; 392/395; 392/406; 392/392; 424/76.1; 514/136; 514/365; 514/490; 514/530; 514/531; 514/533; 514/617; 514/693; 514/737; 514/751; 514/765
[58] Field of Search ............... 514/136, 490, 356, 530, 514/531, 533, 617, 693, 737, 751, 765; 424/76.2, 76.1; 392/392, 395, 406

[56] References Cited

U.S. PATENT DOCUMENTS

3,431,393  3/1969  Katsuda ............................. 219/274
4,745,705  5/1988  Yamamoto et al. .................. 43/125

FOREIGN PATENT DOCUMENTS

253640   1/1988  European Pat. Off. .
59-40409  9/1984  Japan .
62-45986  3/1987  Japan .

OTHER PUBLICATIONS

The March Index, 10th ed. (1983) Nos. 3065 and 7737.

*Primary Examiner*—Allen J. Robinson
*Attorney, Agent, or Firm*—Armstrong, Westerman, Hattori, McLeland & Naughton

[57] ABSTRACT

The present invention provides a cordless thermal vaporizer of the liquid type wherein the body of the vaporizer has a heater for heating a wick for drawing up a chemical solution from a bottle, and a socket disposed under the heater and removably fittable in the form of a cap to the bottle for attachment thereto. The body is reduced in weight and thereby made attachable to an electric outlet with stability. The solution bottle can be attached directly to the socket of the body and is therefore easy to replace.

1 Claim, 6 Drawing Sheets

METHOD FOR THERMAL VAPORIZATION OF CHEMICAL

This application is a division of application Ser. No. 710,482 filed Jun. 5, 1991, now abandoned, which is a division of application Ser. No. 425,211 filed Oct. 6, 1989 and issued as U.S. Pat. No. 5,038,394.

TECHNICAL FIELD

The present invention relates to devices for thermal vaporization, and more particularly to thermal vaporizers of the so-called cordless type for use as directly attached to electric outlets provided on interior vertical surfaces as of walls, pillars, etc.

BACKGROUND ART

Thermal vaporizers, such as electric mosquito controlling devices, include those of the mat type wherein a mat impregnated with an insecticidal solution is used as placed on a heat plate, and those of the liquid type wherein a chemical solution is heated for vaporization while being drawn up through a wick from a bottle. Those of the mat type include cordless devices already proposed, while cordless devices of the liquid type have yet to be proposed. The electric mosquito controlling device of the liquid type is relatively heavy in its entirety since the overall weight of the device includes the weight of the device body and that of the solution bottle. If cordless, the entire device must be supported against gravity solely by a plug attached to the electric outlet. It is therefore likely that the plug will slip off the outlet when the device is heavy. This defect has been a serious obstacle to overcome in designing cordless liquid-type devices. For example, the conventional electric mosquito controlling device of the liquid type with a cord comprises a box-shaped body and is used with a solution bottle accommodated in the body. The device body of the conventional structure must have a height at least sufficient for the body to accommodate the solution bottle and the wick projecting upward from the bottle, and is consequently large-sized, heavy and unsuited for use as a cordless device. The device is further inconvenient in that the bottom portion of the device body needs to be removed when the solution bottle is to be accommodated in the body.

DISCLOSURE OF THE INVENTION

The main object of the present invention is to provide a cordless thermal vaporizer of the liquid type which is usable as attached to an electric outlet reliably with stability.

Another object of the invention is to provide a cordless thermal vaporizer of the liquid type wherein a chemical solution bottle can be attached to the body of the device easily.

Still another object of the invention is to provide a thermally vaporizable chemical solution which is usable for a prolonged period of time for thermal vaporization and can therefore be used as contained in a small bottle.

Other features of the present invention will become apparent from the following description.

The present invention provides a cordless thermal vaporizer for use with a plug inserted in an electric outlet, the vaporizer being characterized in that the body of the vaporizer is internally provided with a heater for heating a wick for drawing up a chemical solution from a bottle, and a socket disposed under the heater and removably fittable in the form of a cap to the bottle for attachment thereto.

The thermal vaporizer of the present invention is so constructed that the body thereof can be fittingly attached, at its socket in the form of a cap, to the chemical solution bottle. Accordingly, the body is smaller in size, especially in the dimension along the direction of its height, and in weight than the box-shaped conventional one. The reduced weight lessens the burden on the plug blades inserted in the outlet during use, almost completely eliminating the tendency for the plug to slip off the outlet and making the vaporizer usable as attached to the outlet reliably with stability.

Since the solution bottle can be attached directly to the socket of the vaporizer body, the bottle is easy to fit in and remove.

According to the present invention, the plug is provided on the rear side of the vaporizer body. Electric outlets are divided into two types: the vertical type for use with (two or three) plug blades as arranged vertically, and the horizontal type for use with plug blades as arranged horizontally. Either the vertical type or the horizontal type is used in countries depending on the domestic situation. When the plug is rotatable through an angular range of 0 to 90 degrees relative to the rear side of the body to make the arrangement of the plug blades selectively changeable to the vertical or horizontal direction, the vaporizer is usable for either one of the two types of outlets, hence convenient.

According to the present invention, the vaporizer body can be provided at its lower end with a skirt for forming a circumferential clearance around the outer periphery of the solution bottle. The skirt functions as a protective member for protecting the solution bottle from external impact and further as a cover member for holding the bottle out of sight. Further when the clearance is made to communicate with the interior of the body, an air current flows upward through the clearance into the body, permitting a vapor of chemical to be entrained in the upward air current, whereby the chemical vapor can be diffused effectively.

The thermally vaporizable chemical solution to be used as contained in the solution bottle according to the invention is a solution of at least one of chemicals such as insecticides, bactericides, repellents, miticides plant growth regulating agents, rodenticides, cosmetics, medicinals, perfumes, deodorants, herbicides, fungicides, insect repellents for clothes, mold inhibitors, etc. When required, various additives such as synergists and antioxidants are added to the solution.

Preferably, these chemicals have a high vapor pressure of at least $3.5 \times 10^{-8}$ mm Hg/20° C. Examples of such chemicals are given below.

Insecticides (S)-2-Methyl-4-oxo-3-(2-propynyl)cyclopent-2-enyl(1R)-cis.trans-chrysanthemate (common name: Prallethrin, brand name: Etoc, product of Sumitomo Chemical Co., Ltd., hereinafter referred to as "AC")

1-Ethynyl-2-methyl-2-pentenyl cis.trans-chrysanthemate (hereinafter referred to as "AO")

1-Ethynyl-2-methyl-2-pentenyl 2,2-dimethyl-3-(2-methyl-1-propenyl)cyclopropane-1-carboxylate (hereinafter referred to as "AP")

1-Ethynyl-2-methyl-2-pentenyl 2,2,3,3-tetramethylcyclopropanecarboxylate (hereinafter referred to as "AQ")

1-Ethynyl-2-methyl-2-pentenyl 2,2-dimethyl-3-(2,2-dichlorovinyl)cyclopropane-1-carboxylate (hereinafter referred to as "AR")

2-Methyl-4-oxo-3-(2-propynyl)cyclopent-2-enylchrysanthemate (hereinafter referred to as "AS")

0,0-Dimethyl 0-(2,2-dichloro)vinyl phosphate (hereinafter referred to as "AT")

o-Isopropoxyphenyl methylcarbamate (hereinafter referred to as "AU")

Deodorants

Lauryl methacrylate, geranyl crotonate, citronella oil and lemon grass oil

Bactericide p-Chloro-m-xylenol (PCMX) and thiabendazole (TBZ)

Rodent repellents

N,N-Diethyl-m-toluamide (Deet) and dimethyl phthalate

Insect repellents for clothes

Empenthrin, naphthalene and p-dichlorobenzene

Suitable solvents for dissolving the chemical are those having a boiling point of up to 350° C. Examples of such solvents are water, Deet, alcohol, silicone, aliphatic hydrocarbons, etc. Especially suitable aliphatic hydrocarbons are those having a boiling point of 150° to 350° C.

The concentration of the chemical solution is about 1 to about 80 wt. %, preferably about 6 to about 75 wt. %, more preferably about 15 to about 50 wt. %.

It is desirable to prepare the chemical solution from a chemical having a high vapor pressure and a solvent having a boiling point of up to 350° C. (a boiling point of 150° to 350° C. in the case of aliphatic hydrocarbons). The chemical solution is then usable in a small amount of about 7.5 ml for thermal vaporization for a long period of time of at least 720 hours. Accordingly, the solution bottle to be used can be small, with the result that the thermal vaporizer can be attached to the outlet more reliably with higher stability.

The wick to be provided on the solution bottle may be made of any of various materials commonly used, such as felt, cotton, pulp, nonwoven fabric, asbestos, inorganic molding, etc. Preferred wicks are those made of felt, biscuit, pulp and inorganic molding. Examples of molded inorganic wicks are those prepared from porcelain porous material, glass fiber, asbestos or like inorganic fiber in the form of solid pieces with use of a binder such as gypsum, bentonite or the like, or those prepared from a mineral powder such as kaolin, activated clay, talc, kieselguhr, clay, perlite, bentonite, alumina, silica, alumina silica, titanium, fired vitreous voltanic rock powder, fired vitreous volcanic ash powder or the like, as used singly or in combination with wood flour, carbon powder, activated carbon or the like, in the form of solid pieces, using a glue such as dextrin, starch, gum arabic, synthetic glue, carboxymethyl cellulose or the like. More preferably, the wick is prepared from 100 parts by weight of such a mineral powder and 10 to 300 parts by weight of wood flour or a mixture of wood flour and carbon powder and/or activated carbon in an amount equal to that of wood flour in weight, by admixing with the resulting mixture 5 to 25 wt. % of a glue based on the wick to be obtained, kneading the mixture with addition of water, extruding the mixture and drying the extrudate. It is desired that the wick be 1 to 40 hours, more desirably 8 to 21 hours, in oil absorption speed. The term "oil absorption speed" means a value determined by immersing the wick, as dimensioned to 7 mm in diameter and 70 mm in length, in liquid n-paraffin at 25° C. over a length of 15 mm from its lower end and measuring the time required for the n-paraffin to reach the top of the wick. The wick may have incorporated therein pigments such as Malachite Green, fungicides such as sorbic acid, salts thereof and dehydroacetic acid, etc. in addition to the mineral powder, wood flour and glue.

The heater to be used in the vaporizer is generally an electric heater which produces heat when energized, whereas the heater is not limited to the electric one but can be any known heater including, for example, a material which produces heat on oxidation in air or a pyrogenic material utilizing platinum catalyst or the like.

BEST MODE OF CARRYING OUT THE INVENTION

Various embodiments of the invention will be described below with reference to the accompanying drawings.

Figure 1:
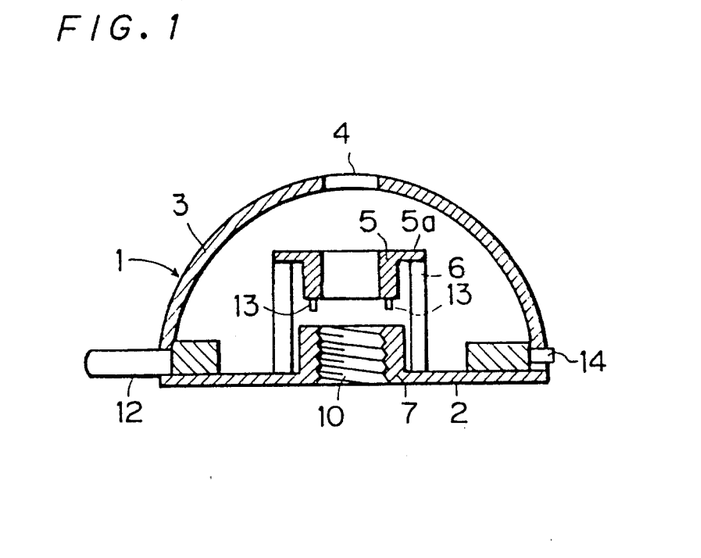
FIG. 1 is a view in vertical section showing a first embodiment of the invention.
Figure 2:
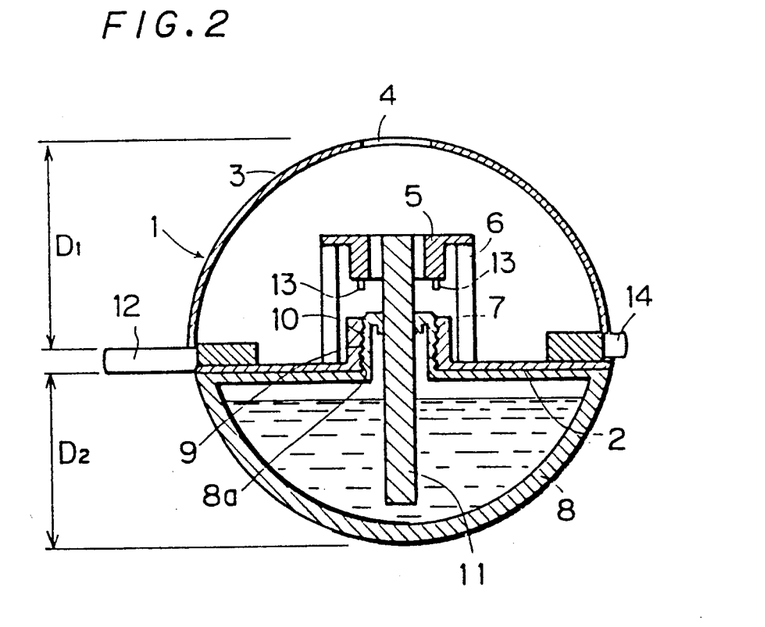
FIG. 2 is a view in vertical section showing the first embodiment with a chemical solution bottle attached thereto.
Figure 3:
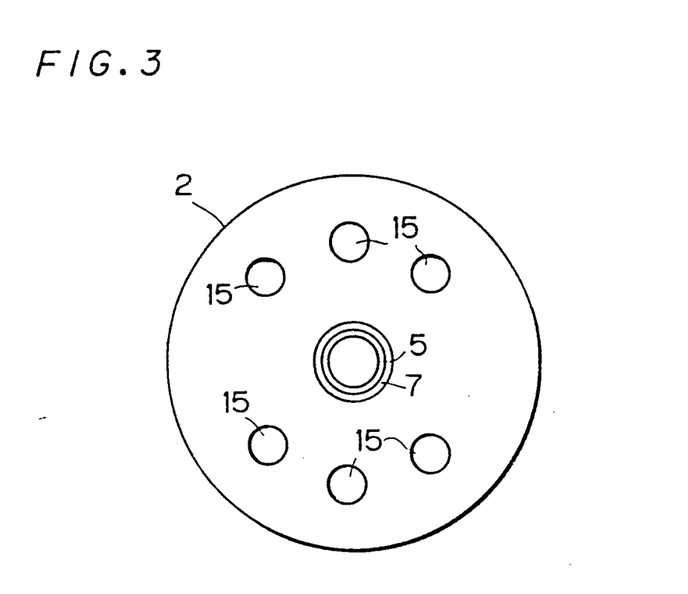
FIG. 3 is a bottom view showing a modification of the first embodiment.

FIG. 1 shows a first embodiment of the invention designed specifically for use with an outlet with blades in a horizontal arrangement. The embodiment has a vaporizer body 1 comprising a flat bottom portion 2 and a semispherical cover portion 3. A vapor outlet 4 is formed in the center of the top of the cover portion 3. A ring heater 5 having an opening extending vertically therethrough is provided inside the body 1 below the vapor outlet 4. The heater 5 is supported at an outer flange 5a thereof by a stay 6 on the bottom portion 2. Provided under the heater 5 is a bottle socket 7 projecting upward from the bottom portion 2 and having an opening extending vertically therethrough. The socket 7 is formed on its inner periphery with a threaded portion 10 adapted for screw-thread engagement with a threaded portion 9 on the outer periphery of the mouth 8a of a chemical solution bottle 8 (see FIG. 2). As seen in FIG. 2, the solution bottle 8 is provided with a wick 11 which is insertable into the ring heater 5 concentrically therewith when the bottle 8 is attached at its mouth 8a to the socket 7. Plug blades 12 (two blades in a pair) in a horizontal arrangement are fixed to the lower end of the body 1 on its rear side. The plug blades 12 are connected to the respective terminals 13, 13 of the ring heater 5 with lead wires (not shown) in the usual manner. A switch 14 for turning on and off the heater 5 is provided at the lower end of the body 1 on its front side. As seen in the bottom view of FIG. 3, air intakes 15 can be formed in the bottom portion 2 of the body. The air intakes 15 serve to diffuse the chemical on vaporization.

When the vaporizer is to be used, the solution bottle 8 is attached at its mouth 8a to the socket 7 on the body bottom portion 2 by the screw-thread engagement of the threaded portions 9, 10, whereby the wick 11 of the bottle 8 is inserted into the ring heater 5 concentrically therewith. In this state, the heater is energized by inserting the plug blades 12 into an outlet (not shown), whereupon the ring heater 5 produces heat to heat the upper portion of the wick 11. A chemical solution can therefore be vaporized in the same manner as is the case with a device having a cord.

The vaporizer is used for insecticidal application by heating the wick 11 at a suitable temperature at which the chemical solution in the bottle 8 can be vaporized from the wick 11. The heating temperature is not limited specifically but is suitably determined, for example, according to the kind of insecticidal or like solution. The surface temperature of the heat producing member is usually in the range of about 70° to about 150° C., preferably 110° to 145° C. In terms of the surface temperature of the wick 11, this range corresponds to about 60° to about 135° C., preferably about 95° to about 130° C.

Since the solution bottle 8 can be attached at its mouth 8a to the socket 7 on the body bottom portion 2, the bottle 8 is very easy to attach to and remove from the body 1. Because the socket 7 of the body 1 is merely fitted in the form of a cap to the mouth 8a of the solution bottle 8, the body 1 is diminished in size, especially in the dimension in the direction along its height. This results in a corresponding decrease in the weight of the body 1, i.e., of the entire vaporizer, rendering the vaporizer attachable to the outlet with stability. The solution bottle 8, which is left exposed, can be prevented from being overheated by the heater and has the advantage that the amount of remaining solution can be readily checked through the bottle.

Although the screw-thread engagement between the threaded portions 9, 10 is resorted to for attaching the solution bottle 8 to the socket 7, the threaded portions 9, 10 may alternatively be replaced by a projection and an indentation which are engageable with each other. The solution bottle 8 may be sized as desired insofar as the vaporizer can be attached to the outlet free of trouble.

When the thermal vaporizer of the present invention is to be used as attached to a double outlet, it is likely that the body 1 (including the bottle 8) attached to one of the outlets will cover the other outlet to make the other outlet unusable depending on the size of the body 1. Accordingly, it is desired that the dimensions of the vaporizer above and below the plug blades 12 be smaller than the spacing between the upper and lower outlets. For example, when the distance between the adjacent inner ends of the two outlets is 25 mm, the distances D1 and D2 shown in FIG. 2 are made not greater than 25 mm.

Figure 4:
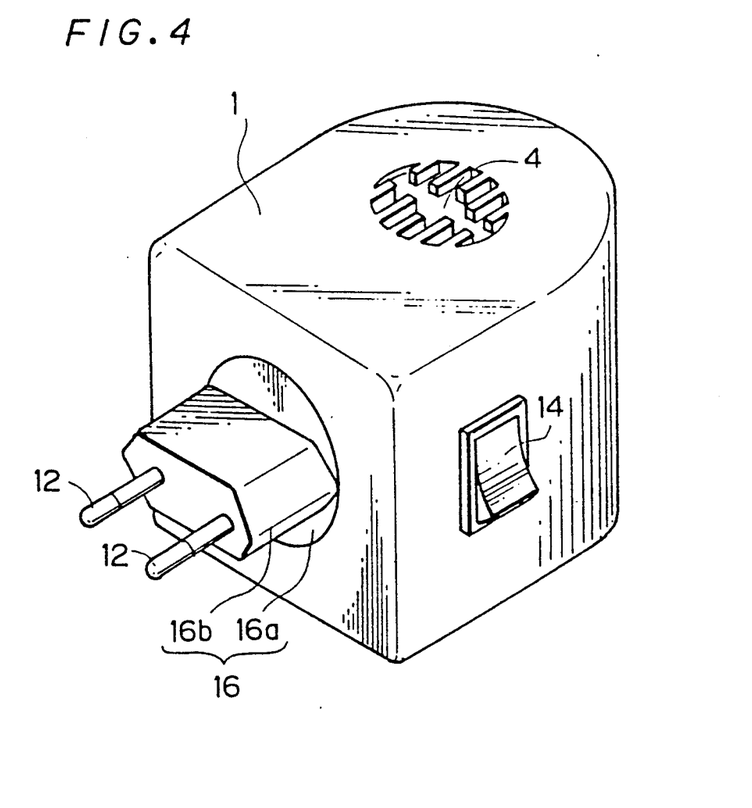
FIG. 4 is a perspective view showing a second embodiment of the invention.
Figure 5:
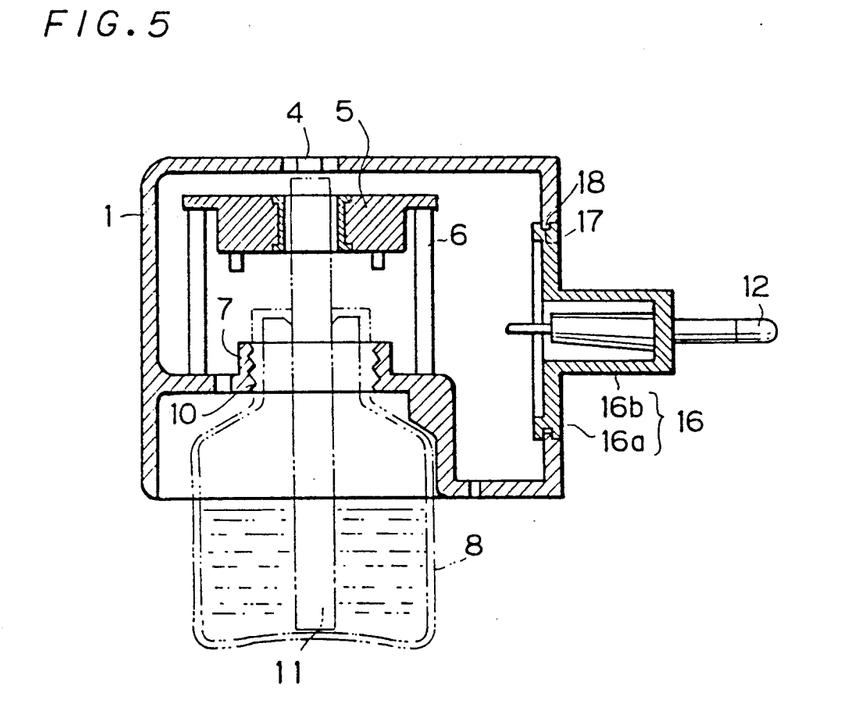
FIG. 5 is a view in vertical section of the same.
Figure 6:
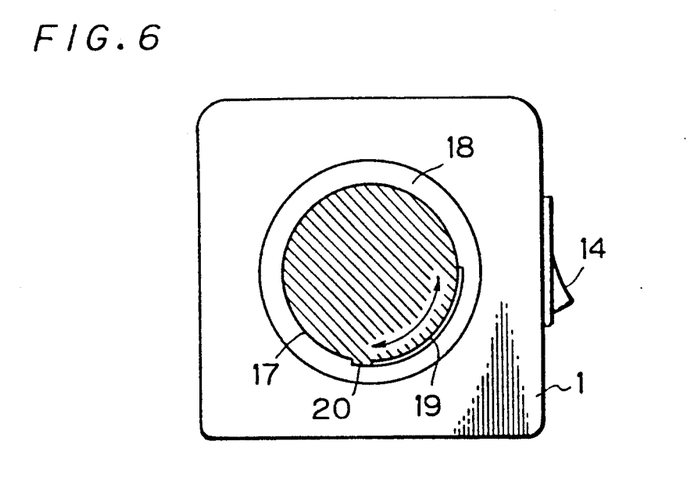
FIG. 6 is a view illustrating an example of means for limiting the rotation of a rotatable member of the same.

FIGS. 4 to 6 show a second embodiment of the invention which is substantially the same as the embodiment of FIGS. 1 and 2 except that it is usable for both the outlet with plug holes in horizontal arrangement and the outlet with plug holes in vertical arrangement.

With this embodiment, a rotatable member 16 having a pair of plug pieces 12, 12 opposed to each other with the center of rotation positioned therebetween is fitted in the rear side of the body 1 centrally thereof. The rotatable member 16 has at its base end a disc portion 16a formed with an annular groove 17 in its outer periphery. An annular ridge 18 on the body 1 is fitted in the groove to render the rotatable member 16 rotatable. The plug pieces 12 may be pins or blades, or three pins including a grounding pin are usable as desired.

With reference to FIG. 6, the annular ridge 18 on the body 1 has a cutout 19 over an angular range of 90 degrees. A protrusion 20 projecting from the bottom of the annular groove 17 in the rotatable member 16 is fitted in the cutout 19. As indicated by arrows in FIG. 6, the protrusion 20 is movable with the rotation of the rotatable member 16 through the cutout 19 over the angular range of from 0 to 90 degrees. For example when the protrusion 20 bears on one end of the cutout portion 19 as shown in FIG. 6, the plug pieces 12, 12 are arranged vertically, whereas when the protrusion bears on the other end of the cutout portion, the plug pieces are arranged horizontally.

According to the present embodiment, the plug pieces 12, 12 can be positioned selectively in the horizontal or vertical arrangement as desired by rotating the rotatable member 16. In foreign countries, outlets are available in two types, i.e., horizontal and vertical, with respect to the arrangement of plug holes. The device with the plug usable for the two types is suited especially for export.

The rotatable member 16 has a seat portion 16b projecting outward from the central part of the disk portion 16a. The seat portion 16b has the plug pieces 12, 12 fixedly implanted therein. When the plug pieces 12, 12 are inserted into the outlet (not shown), the seat portion 16b provides a space between the body 1 and the outlet, consequently between the body and a pillar or wall, preventing the vapor of chemical component from depositing on the pillar or wall when the vapor is released from the top outlet 4 of the body 1. The seat portion 16b may be dispensed with.

FIGS. 7 to 11 show a third embodiment of the invention which is substantially the same as the embodiment shown in FIGS. 1 and 2 except that a skirt 21 is formed integrally with the lower end of the body 1.

Figure 10:
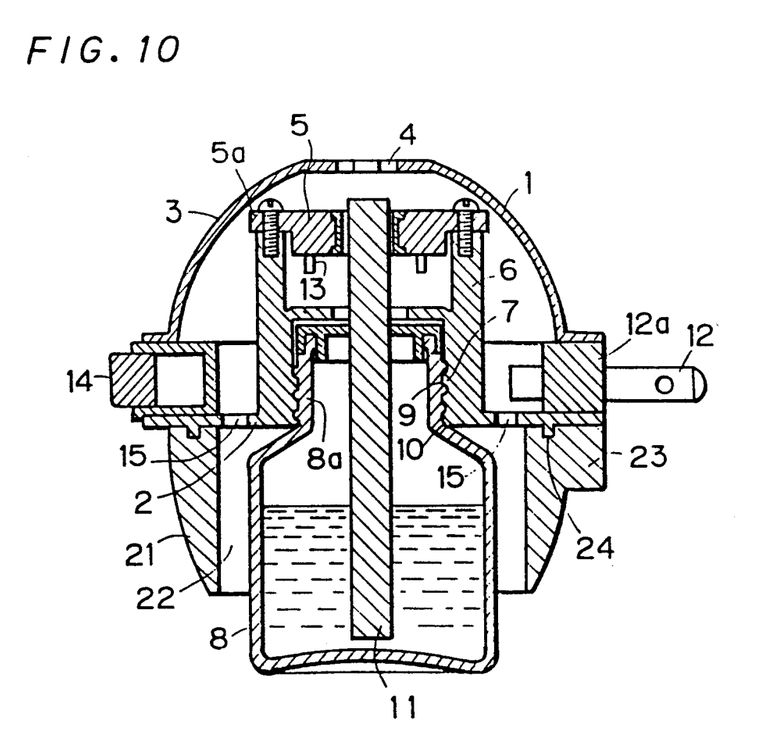
FIG. 10 is a view in section taken along the line A—A in FIG. 8 and showing the same in use.

As will be apparent from the sectional view of FIG. 10 showing the embodiment in use, the solution bottle 8 attached to the socket 7 on the body 1 is surrounded by the skirt 21, which serves as a cover member for holding the solution bottle 8 out of sight and as a protective member for protecting the bottle 8 from impact or damage to be applied or caused thereto from outside. These two functions give an attractive appearance to the product and make it usable with safety.

Figure 11:
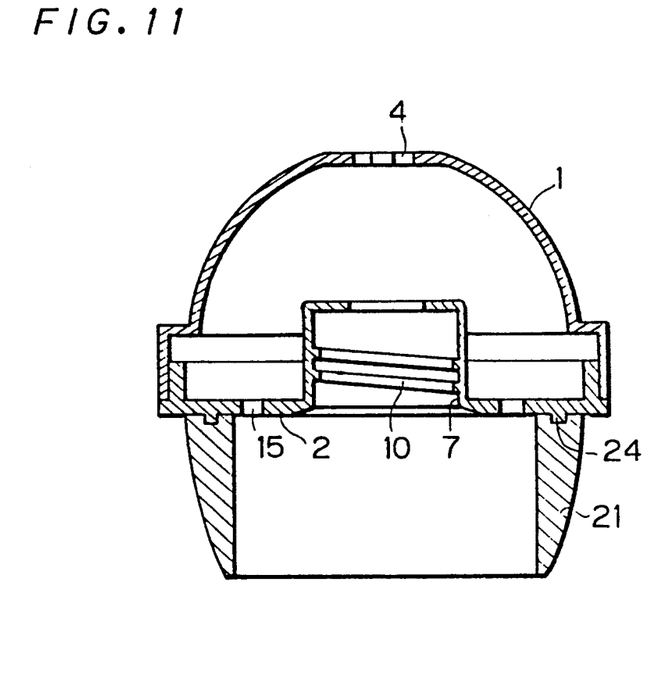
FIG. 11 is a view in section taken along the line B—B in FIG. 8 and showing the same with a heater omitted.

A circumferential clearance 22 formed between the solution bottle 8 and the skirt 21 is in communication with the interior of the body 1 through the intakes 15 in the bottom portion of the body 1, permitting outside air to flow into the body 1 smoothly. The upward current produced inside the body 1 diffuses the chemical with improved effectiveness on vaporization. Such an improvement in the diffusibility of the vaporized chemical can be achieved favorably especially by giving the vapor outlet 4 an overall opening area which is 2 to 40 times, preferably 5 to 15 times, the cross sectional area (thickness) of the wick 11 and making the total opening area of the air intakes 15 1.5 to 20 times, preferably 3 to 10 times, as large as the wick cross sectional area. The intake of outside air into the body 1 prevents the over-heating of the bottle 8 and the rise of internal pressure thereof, thus serving to prevent leakage from the solution bottle 8. The intake 15 may be formed in a side portion of the body 1.

Figure 7:
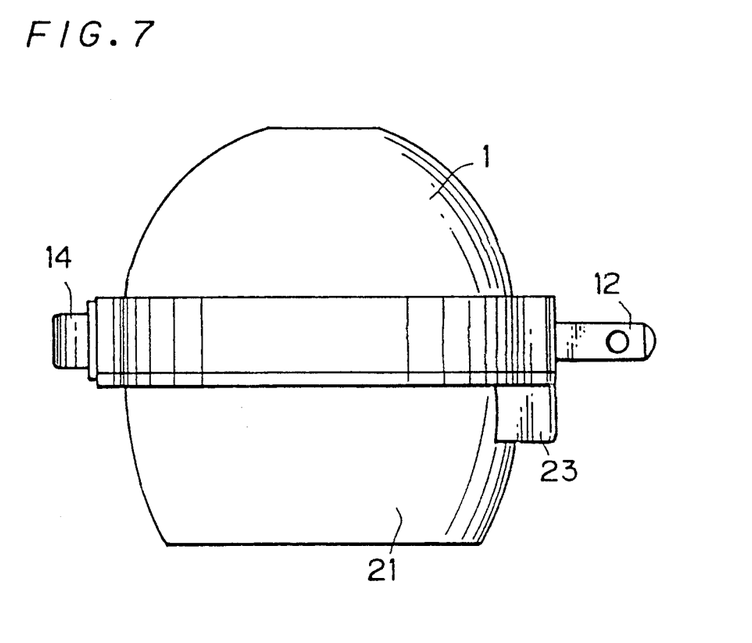
FIG. 7 is a side elevation showing a third embodiment of the invention.
Figure 8:
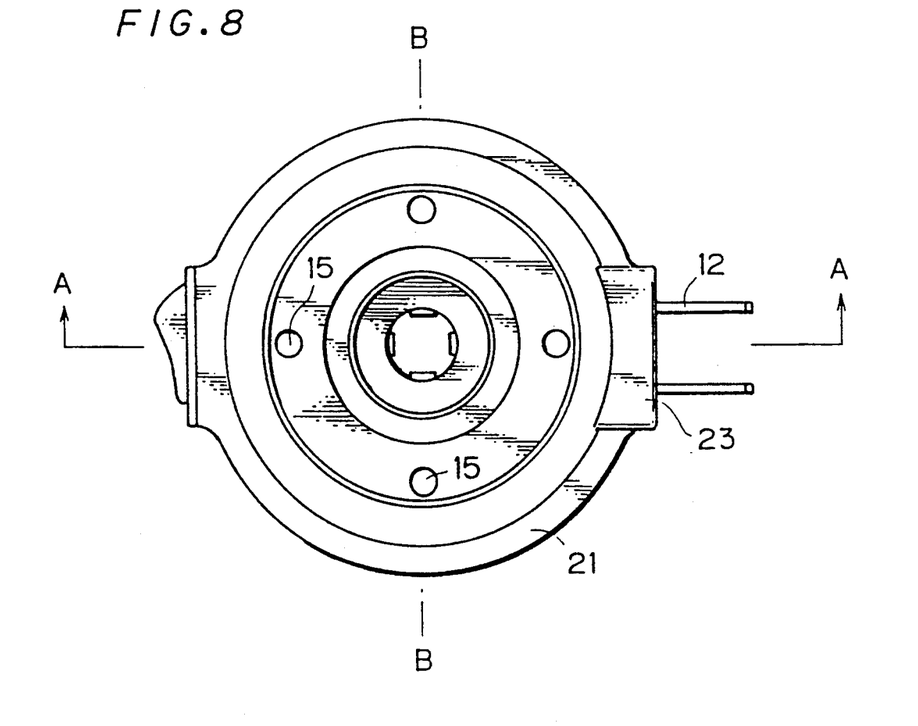
FIG. 8 is a bottom view of the same.
Figure 9:
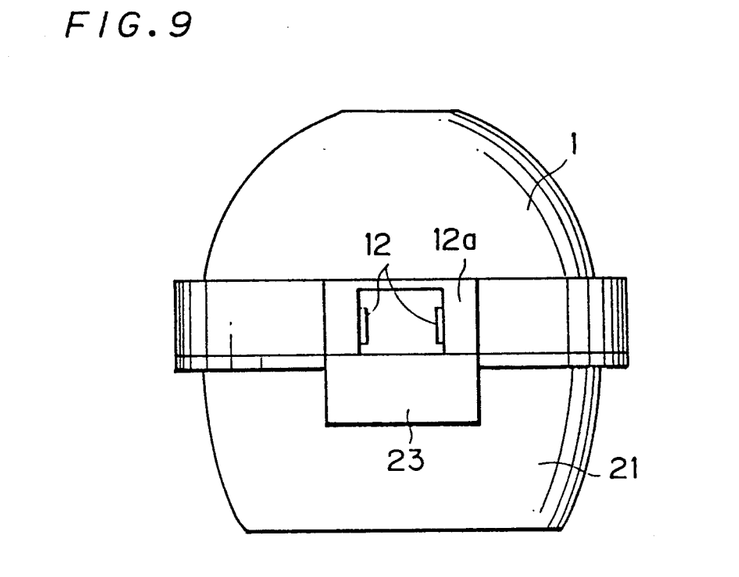
FIG. 9 is a rear view of the same.

According to the present embodiment, the skirt 21 can be formed at the upper end of its rear side with a projection 23 projecting outward so as to be flush with the rear face of the plug block 12a at the block lower end. When the plug is attached to the outlet, the projection 23 bears against the outlet face under the lower end of the plug block 12a to support the product against gravity by bearing contact with the outlet. This serves to lessen the gravitational load on the outlet-inserted portions of the plug, permitting the product to be held attached to the outlet with improved stability.

When the skirt 21 is made suitably detachable from the body 1 at a projection-indentation fitting portion 24, the solution bottle 8 can be conveniently replaced with the skirt 21 removed. When the skirt 21 is given the largest possible inside diameter, solution bottles 8 ranging from small to large sizes are usable free of trouble.

When the plug block 12a is rotatable or slidable with the plug pieces 12 made retractable into the body 1 suitably, the vaporizer can be packaged or stored in a compacted state, hence convenient.

Figure 12:
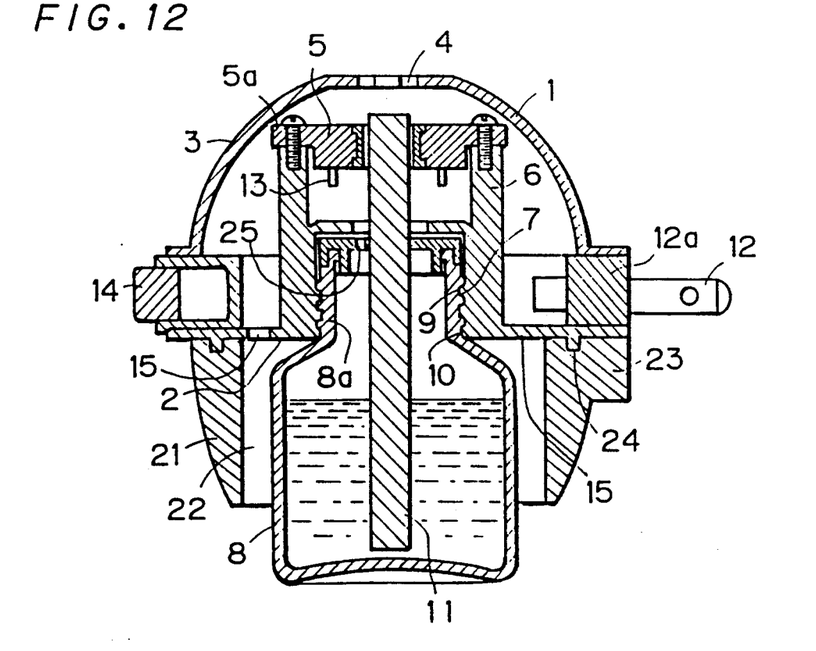
FIG. 12 is a view in vertical section showing a preferred example of chemical solution bottle in use.

FIG. 12 shows a preferred example of chemical solution bottle 8 wherein a balance hole 25 is formed in its cap. When the internal temperature of the bottle 8 rises to raise the internal pressure during use for thermal vaporization, the balance hole 25 releases the pressure to the outside, thus serving to automatically maintain the internal pressure of the bottle 8 in balance with the external pressure. The pressure balance thus ensured completely eliminates the likelihood that the solution will spill out from the bottle 8 through the wick 11. The balance hole 25 may be preformed, or the bottle cap may have a thin wall portion for forming the balance hole 25 therein when the vaporizer is to be used. The balance hole 25, when preformed, may be closed with a seal before use.

The solution bottle 8, which is left exposed at its lower portion, has the advantages that the bottle can be prevented from being overheated by the heater and permits the user to recognize the amount of remaining chemical solution like those of FIGS. 1 to 6.

According to the invention, the heater 5 may be suspended by a support (not shown) from the cover portion 3 of the body 1 centrally thereof.

The cordless thermal vaporizer of the liquid type embodying the invention is so constructed that the body 1 thereof is attachable to the solution bottle with its socket 7 fitted thereto like a cap. The body 1 is therefore smaller and more lightweight than box-shaped bodies. Accordingly, the vaporizer can be used as attached to the outlet reliably with good stability, with a reduced gravitational load on the outlet-inserted plug portions. Further because the solution bottle 8 can be attached to the socket 7 of the body 1 as directly fitted thereto, the bottle 8 is easy to attach to and remove from the body 1.

Thus, the present invention provides a cordless thermal vaporizer of the liquid type which is usable as attached to an outlet with good stability, along with a chemical solution bottle which is easy to replace.

Chemical solutions useful for the thermal vaporizer of the invention will be described below in greater detail.

EXPERIMENTAL EXAMPLES 1-23

Chemical solutions for use in the invention were prepared by mixing together specified proportions of the insecticide AC, AO, AP or AQ, organic solvent and, when required, the compound CA, CB or CQ as listed in Table 1.

TABLE 1

| Example No. | Insecticide (wt. %) | Compound (wt. %) | Solvent (wt. %) |
|---|---|---|---|
| 1 | AC (16) | | BF (84) |
| 2 | AC (16) | | BB (84) |
| 3 | AC (16) | | BC (84) |
| 4 | AC (16) | | BD (84) |
| 5 | AC (24) | CA (0.3) | BD (75.7) |
| 6 | AC (24) | | BD (76) |
| 7 | AC (24) | CB (0.3) | BD (75.7) |
| 8 | AC (24) | CQ (0.3) | BC (75.7) |
| 9 | AC (24) | | BA/BF (38/38) |
| 10 | AC (24) | | BB/BE (38/38) |
| 11 | AO (16) | | BB (84) |
| 12 | AP (19) | | BA (81) |
| 13 | AP (9) | | BB (91) |
| 14 | AP (18) | CA (0.3) | BC (81.7) |
| 15 | AP (24) | | BD (76) |
| 16 | AP (24) | | BA/BC (38/38) |
| 17 | AQ (19) | | Bb (81) |
| 18 | AQ (9) | | BC (91) |
| 19 | AQ (37) | | BD (63) |
| 20 | AQ (24) | CA (0.6) | BE (75.4) |
| 21 | AQ (24) | | BA/BD (38/38) |
| 22 | AQ (24) | | BB/BC (38/38) |
| 23 | AR (16) | | BB (84) |

The symbols used for the solvents given in Table 1 represent the following.

BA: aliphatic hydrocarbon boiling at 150°-180° C./760 mm Hg.
BB: aliphatic hydrocarbon boiling at 180°-210° C./760 mm Hg.
BC: aliphatic hydrocarbon boiling at 210°-240° C./760 mm Hg.
BD: aliphatic hydrocarbon boiling at 240°-270° C./760 mm Hg.
BE: aliphatic hydrocarbon boiling at 270°-300° C./760 mm Hg.
BF: aliphatic hydrocarbon boiling at 300°-350° C./760 mm Hg.

The insecticides listed in Table 1 have the following vapor pressure.

AC: $3.5 \times 10^{-5}$ mm Hg/20° C.

AP: $1.6 \times 10^{-3}$ mm Hg/30° C.

AQ: $3.0 \times 10^{-3}$ mm Hg/30° C.

AR: $5.0 \times 10^{-4}$ mm Hg/30° C.

COMPARATIVE EXAMPLE 1

A comparative chemical solution was prepared using 12 wt. % of Phthalthrin (product of Sumitomo Chemical Co., Ltd.) having a vapor pressure of $3.5 \times 10^{-8}$ mm Hg/20° C. and serving as an insecticide and 88 wt. % of BD serving as a solvent. BD stands for 1,3,4,5,6,7-hexahydro-1,3-dioxo-2-isoindolyl methyl-dl-cis.trans chrysanthemate.

A 7.5 ml quantity of each of the chemical solutions prepared in Examples 1 to 4 and the comparative solution obtained in Comparative Example 1 was placed into the bottle 8 shown in FIG. 2. The heater 5 was energized to heat the upper portion of the wick 11 from therearound to a temperature of 115° C. and thereby test the solution for the vaporization of the insecticide in the solution. The wick 11 was prepared by admixing 20 parts by weight of starch and water with 60 parts by weight of perlite and 20 parts by weight of wood flour, kneading the mixture and extruding the mixture, followed by drying (6 mm in diameter and 70 mm in length, about 14 hours in oil absorption speed). The heater 5 used was in the form of a disk having an inside diameter of 10 mm and a thickness of 10 mm.

The amount of vaporized insecticide was determined by trapping the vapor in a silica gel column by aspiration every hour, subjecting the silica gel to extraction with chloroform and quantitatively analyzing the extract by gas chromatography after concentration.

Table 2 shows the results obtained by determining the amount of vaporization of the insecticide (mg) per hour, 10 hours, 100 hours, 200 hours, 300 hours and 720 hours after the start of heating of the sample.

TABLE 2

| Sample No. | Hours after start of heating | | | | |
|---|---|---|---|---|---|
| | 10 | 100 | 200 | 300 | 720 |
| Example 1 | 0.80 | 0.91 | 0.95 | 0.91 | 0.77 |
| Example 2 | 0.93 | 1.07 | 1.01 | 0.88 | 0.73 |
| Example 3 | 0.91 | 1.05 | 0.96 | 0.94 | 0.76 |
| Example 4 | 0.88 | 1.02 | 1.03 | 0.97 | 0.85 |
| Comp.Ex. 1 | 0.53 | 0.31 | 0.22 | 0.10 | 0 |

Table 2 reveals that the use of the chemical solution of the invention makes it possible to vaporize the insecticide at a remarkably improved rate and that the improved rate can be sustained even 720 hours after the start of heating almost without a substantial reduction.

The chemical solution of the invention for use with the thermal vaporizer permits the use of a solution bottle of greatly reduced size, while the cordless device can be attached to the outlet reliably with good stability. Further the chemical solution itself is usable for at least 720 hours without clogging the wick, consequently assuring thermal vaporization for a prolonged period of time.

We claim:

1. A method of releasing a chemical into a gas atmosphere, comprising the step of thermally vaporizing a solution of said chemical in a solvent in a thermal vaporizer provided with an integral plug for insertion into an electrical outlet, said thermal vaporizer comprising:

a vaporizer body;

a ring heater mounted within said vaporizer body;

a wick having a cross sectional area, for drawing up a chemical solution from a bottle which wick is insertable into the ring heater concentrically therewith;

a socket disposed under said heater with spacing therebetween;

a bottle fittable in the form of a removable cap to said socket such that when the bottle is in place, one or more openings are provided for said wick;

at least one air outlet formed in the top portion of said vaporizer body, said air outlets having a total opening area that is 2 to 40 times the cross sectional area of said wick;

at least one air intake formed in the bottom portion of the body and having a total opening area that is 1.5 to 20 times the cross sectional area of said wick; and a plug electrically connected to said ring heater, wherein said chemical has a vapor pressure of at least $3.5 \times 10^{-8}$ mm/20° C. and said solvent has a boiling point of not more than 350° C., the concentration of the chemical being in the range of about 1% by weight to about 80% by weight.

* * * * *